Aug. 8, 1961 R. C. SHRECKENGOST 2,995,740
RADAR SYSTEM

Filed Aug. 30, 1957 3 Sheets-Sheet 1

INVENTOR
RAYMOND C. SHRECKENGOST
BY
ATTORNEYS

RAYMOND C. SHRECKENGOST
INVENTOR

Aug. 8, 1961  R. C. SHRECKENGOST  2,995,740
RADAR SYSTEM
Filed Aug. 30, 1957  3 Sheets-Sheet 3
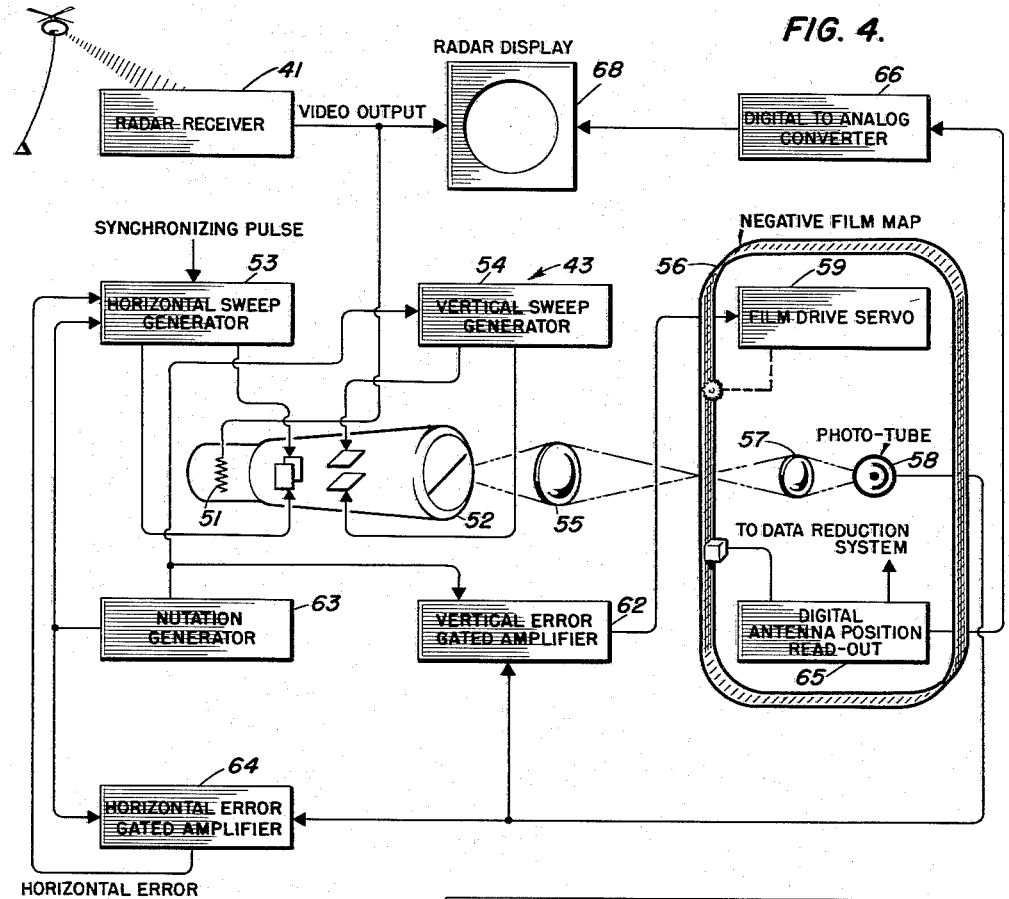
FIG. 4.
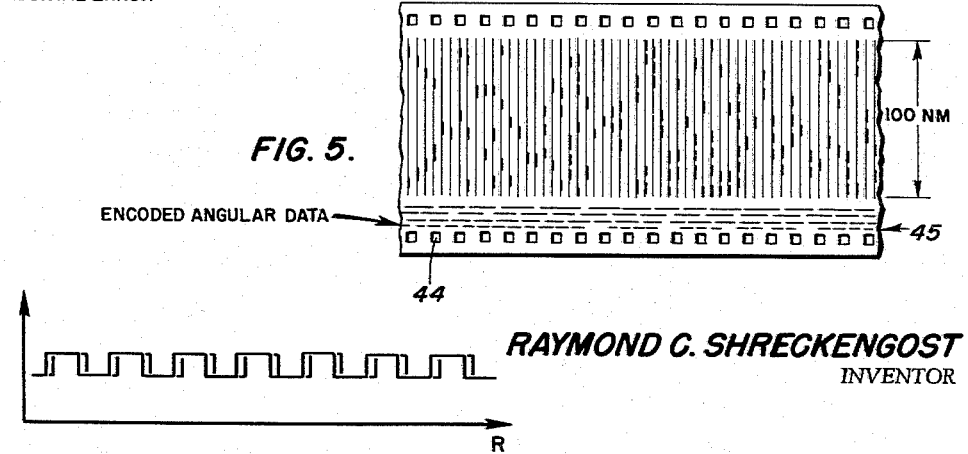
FIG. 5.
FIG. 6.
RAYMOND C. SHRECKENGOST
INVENTOR
BY
ATTORNEYS

2,995,740
RADAR SYSTEM

Raymond C. Shreckengost, Silver Spring, Md., assignor to the United States of America as represented by the Secretary of the Navy
Filed Aug. 30, 1957, Ser. No. 681,422
5 Claims. (Cl. 343—7)

The present invention relates to radar systems. More particularly, it relates to radar apparatus elevated above the terrain under surveillance by means of a tethered aircraft.

It is well known that the effective range of radar in search is limited by the distance to the horizon and that hostile aircraft can escape early detection by flying at low altitudes. It is equally well known that elevating the radar antenna provides a means for extending the radar horizon, and with sufficient antenna altitude, radar contact can be established with low flying aircraft at ranges limited only by the radar power.

Since it is desirable to elevate the radar antenna at least 1000 feet, and preferably more, structures do not provide a practical means of elevation. Picket aircraft have only limited endurance and must break the surveillance for refueling and overhaul. Fixed wing aircraft cannot maintain a single position but must patrol sectors of the defensive area. In patrol, the aircraft's position is seldom known with the degree of accuracy necessary to pin-point a target position so that the target may be sought out by missile batteries or other defense establishments.

It has heretofore been proposed to elevate radar antennas by means of captive balloons in order that the operational time of the equipment will be increased. Balloons, however, are of limited service in times of high wind or under icing conditions, since they are then incapable of maintaining altitude or become so unstable that the radar cannot be effectively operated.

More recently efforts have been made to elevate the radar antenna by means of a tethered helicopter. The helicopter is powered by an electric motor which receives energy through the tethering cable and therefore is capable of remaining aloft for extended periods of time. The helicopter autopilot is capable of maintaining the craft at the desired altitude and of stabilizing the craft against disturbance by wind gusts. There remains, however, the problem of determining the precise location of the antenna, since the autopilot merely controls the flight altitude of the craft.

It is therefore an object of the invention to provide a radar system capable of detecting targets which would be concealed by the horizon from the usual surface borne radar.

It is another object of the present invention to provide a radar having an antenna elevated to a considerable altitude by aircraft and in which the airborne equipment is simplified over radars heretofore devised.

It is a further object of the invention to provide a radar system having at least the antenna airborne by means of captive aircraft and which is capable of yielding precise bearings to distant targets.

Among the more specific objects of the invention is to provide a radar capable of operating beyond the horizon of surface bound radars in which the radar bearing to targets is determined, in part, by means of ground return signals.

Other objects and many of the attendant advantages of this invention will be readily appreciated as the same becomes better understood by reference to the following detailed description when considered in connection with the accompanying drawings.

Briefly, the present invention employs an electrically driven tethered helicopter as antenna elevating means. The tether cable serves to transmit power to the helicopter and may also serve as a communications link between airborne and ground based equipment. The radar data received by the airborne antenna is relayed to the ground station whereupon the position of the radar antenna is automatically determined through comparison of the incoming data with a previously prepared radar survey map.

In the drawings:

FIG. 4 is a functional block diagram of the position measuring apparatus of the present invention;

FIG. 5 is a simplified example of a film map employed in the invention; and

FIG. 6 is a representation of the cathode ray trace of an element of the invention illustrating the form of nutation employed therein.

Figure 1:
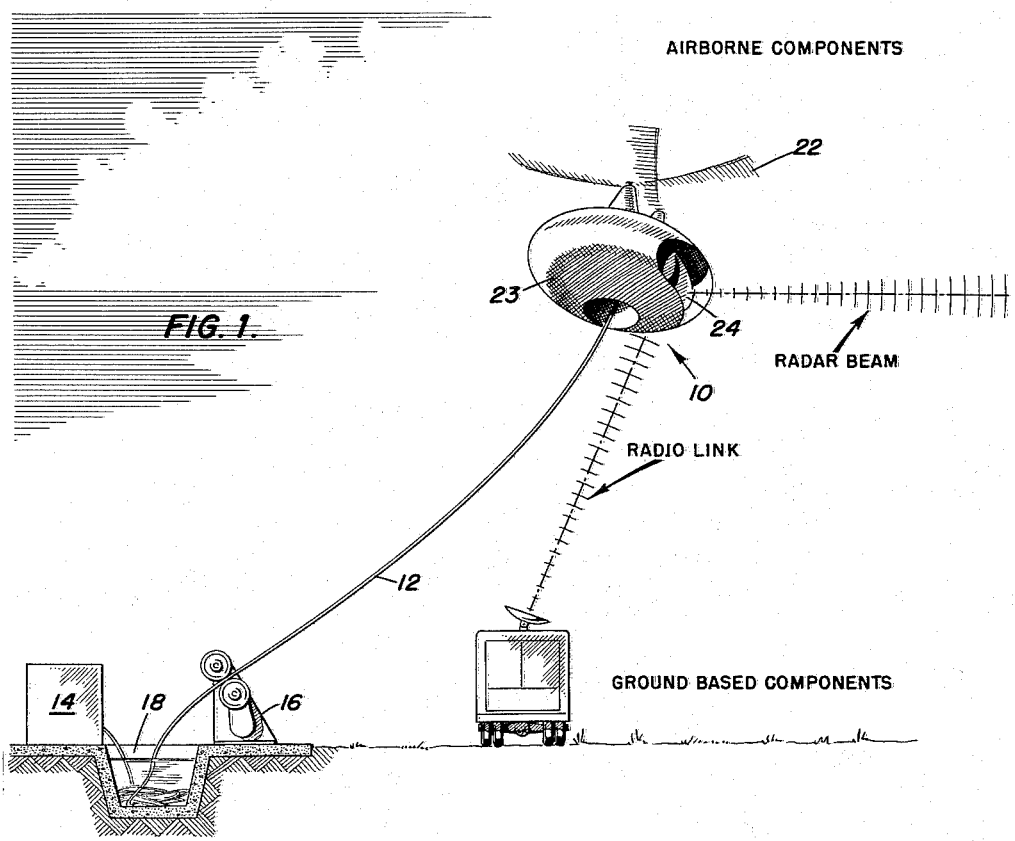
FIG. 1 is a pictorial representation of the radar system of the present invention.

In FIG. 1, the radar antenna is illustrated as being elevated by means of an electrically powered helicopter 10. Although alternative means may be employed for the purpose of elevating the antenna, the tethered helicopter affords several advantages which recommend its employment. Accordingly the helicopter mechanism will be briefly described for the purpose of illustrating the most effective embodiment of the present invention.

The helicopter 10 is tethered by cable 12 which serves also to conduct power from a generator 14 to the helicopter propulsion motor. A suitable winch 16 controls the amount of cable payed out and may include a level wind device for proper cable stowage. Slip rings or similar contacting devices may be eliminated by connecting the cable end to the generator 14 and providing for the cooling of the stowed cable. The means illustrated comprises a well 18 filled with cooled circulating water in which the stowed cable is immersed.

The helicopter 10 is provided with two contrarotating intermeshing rotors 22 which eliminate the necessity for the anti-torque rotor required in a single-rotor type and thereby enables the use of a spheroidal fuselage 23.

Figure 2:
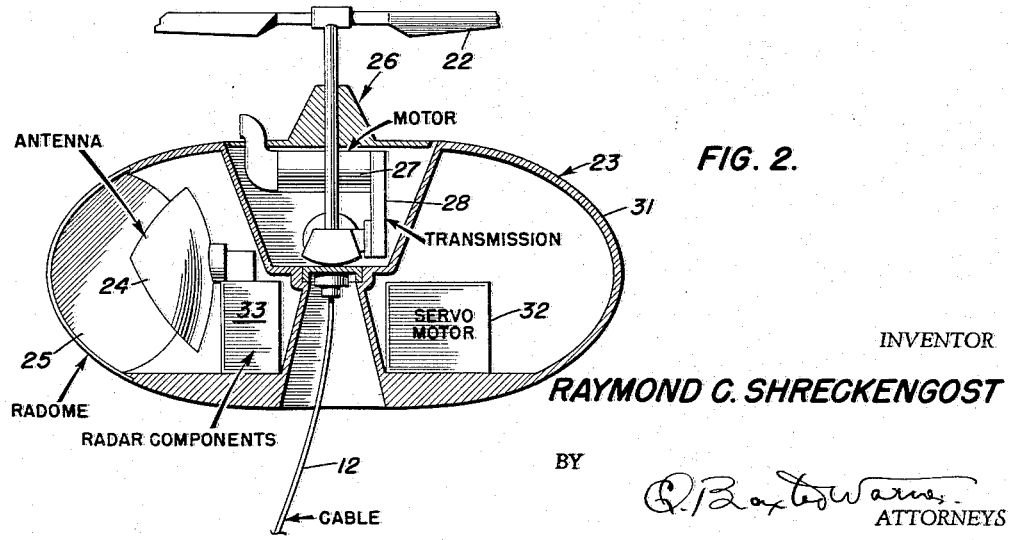
FIG. 2 is a sectional view of a preferred configuration of a helicopter for elevating the radar antenna.

As best seen in FIG. 2, the radar antenna 24 is mounted behind a microwave transparent radome 25 provided in the fuselage 23. The antenna is capable only of limited scan motion within the fuselage, but as will shortly be seen, the entire horizon is scanned by rotation of the outer portion of the fuselage about a stationary central portion.

The outer end of cable 12 is secured substantially at the center of gravity of the helicopter to a hub like central portion 26 of the fuselage 23. Within the central portion 26 are found the electric propulsion motor 27, the rotor transmission 28, and the autopilot components necessary to exert stabilizing control on the helicopter. The outer toroidal portion 31 of the fuselage 23 is mounted for rotation about the stabilized central hub 26. An antenna servomotor 32 engages drive means (not shown) to rotate outer portion 31 and thereby provide azimuth scanning by the radar antenna. Sector scanning, when required, is accomplished by limited movement of the radar antenna within the fuselage 23. The radar oscillator, modulator and power supply are mounted within the fuselage 23 as indicated at 33. Transmitter synchronizing signals and received radar signals are communicated to the ground based components of the radar either through the cable 12 or by means of the radio link illustrated in FIG. 1.

Figure 3:
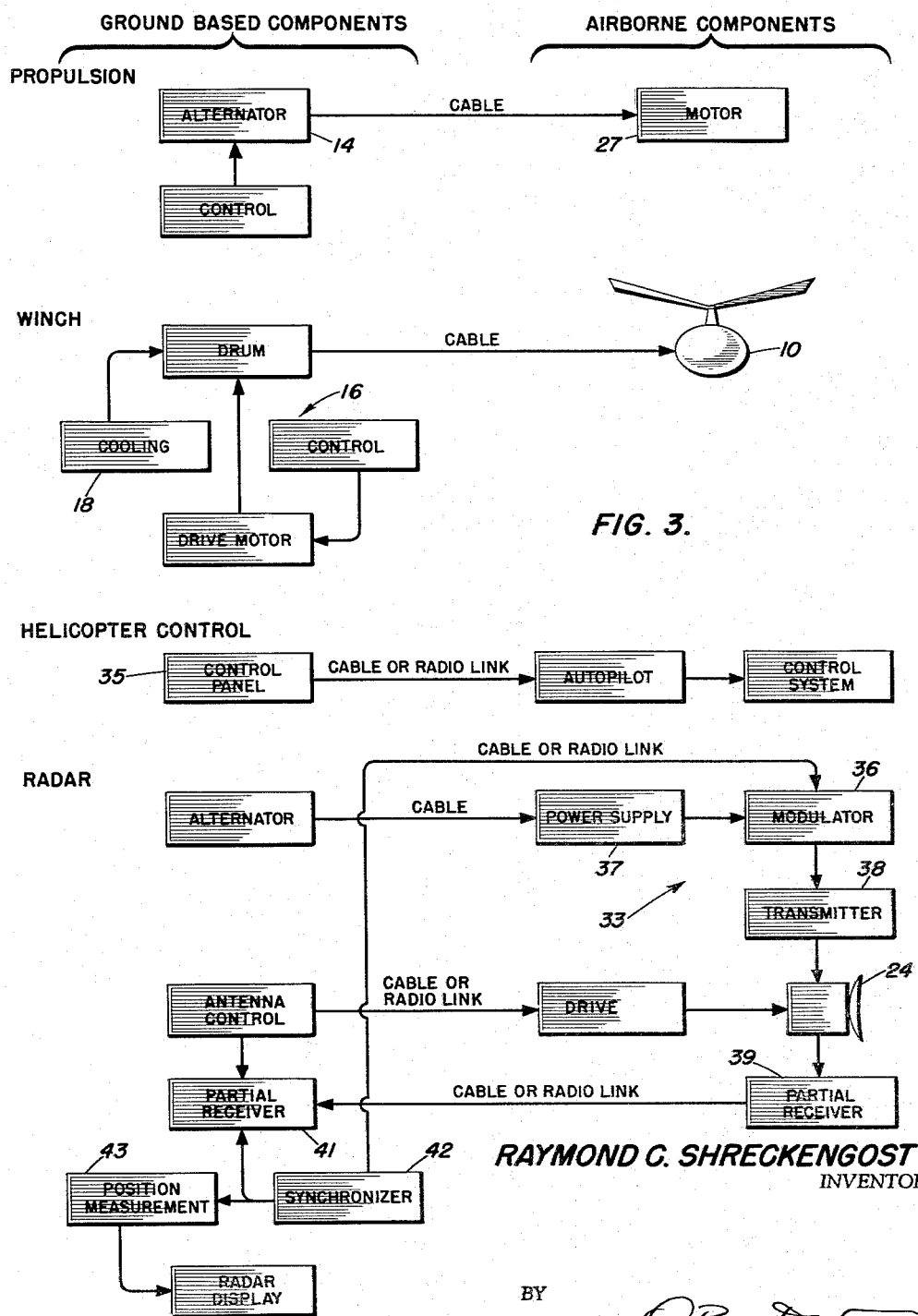
FIG. 3 is a functional block diagram of the radar system of the present invention.

In FIG. 3 there appears a block diagram wherein components of the radar system are segregated into ground based elements and airborne elements. The helicopter propulsion and winch arrangement has been previously described. The helicopter control includes a ground based command control panel 35 and either cable or radio means for communicating command signals to the helicopter autopilot 37. The helicopter control system 38 receives the output of autopilot 37 and regulates the rotor blade angles of incidence to produce lift and the control moments necessary for stabilization or compensation for cable drag.

The helicopter payload is conserved by elevating only those radar components essential to efficient operation. A long microwave transmission line would attenuate the radiated power considerably and would afford little net gain in payload. Therefore, it is desirable to elevate the radar modulator 36 and oscillator 38 along with the antenna 24. The power supply 37 may comprise a transformer and rectifier for developing direct current from the alternating current supplied the helicopter propulsion motor. Alternatively, a generator driven by a power take-off from the propulsion motor may be employed. The radar return signals are detected and amplified in a partial receiver 39, which may include a mixer stage and an IF strip with provision for relaying the output to ground, or more simply may comprise a travelling wave tube which receives the return signals, amplifies and redirects the returns to the ground based receiver 41. Synchronizing pulses from a ground based synchronizer 42 time the operation of modulator 33 and initiate the action of appropriate gate and sweep circuits within the receiver 41.

The video output signal of receiver 41 includes the return signals from various parts of the terrain. At each antenna bearing the video signal is distinct as compared with signals obtained at succeeding bearing angles, but the signals from any particular bearing are substantially exact repetitions of previous signals from the same bearing. A photograph or series of photographs of a visual presentation of the signals returned from the terrain is prepared for the entire scan of the elevated antenna. The photographic record of video signals is then correlated with antenna bearings determined by auxiliary surveying methods to produce a film map of the terrain surrounding the radar.

FIG. 5 is an example of one form the film map may take. The map in the instance illustrated has been prepared on film provided with sprocket holes 44 to facilitate handling in the matching apparatus. A marginal space 45 on the film is reserved for entry of bearing data either in the form of a magnetically recorded impulse or in the form of punched holes.

The position measuring apparatus 43 automatically compares the radar map with the radar video output signal to determine the point of best match. The antenna bearing may then be read directly from the map and inasmuch as the comparisons are rapidly and continuously made, accurate bearings are constantly available from the radar. The bearing data may be encoded in digital form for entry into a defense missile system, or may be supplied in the form of analogue voltages to correct a PPI type radar display.

Referring to FIG. 4, in which the position measuring apparatus 53 is illustrated in block diagram form, the video output signal of radar receiver 41 is applied to the control grid 51 of a cathode ray tube 52. The output of a horizontal sweep generator 53, triggered by a synchronizing pulse from synchronizer 42 of FIG. 3, deflects the cathode rays of tube 52 along the horizontal axis of its face. The cathode rays are intensity modulated by the video return signals with the range to the various reflectors being represented along the horizontal axis of the face of tube 52.

A lens 55 focuses an image of the traces of tube 52 onto the surface of a negative film map 56. A second lens 57 focuses the light originating at the face of tube 52 and transmitted through film map 56 onto the sensitive surface of a photoelectric tube 58. If the trace appearing on the face of tube 52 corresponds to the trace negatively recorded on film map 56, the output of photoelectric tube 58 will be at a minimum.

A film drive servo 59 positions the film map 56 to maintain the output of phototube 58 at a minimum level. A nutation generator 63 applies an alternating voltage of square waveform to the vertical deflection plates and to the horizontal deflection plates of tube 52. The nutation generator 63 also supplies gate voltages which are synchronized with the nutation voltages to a vertical error gated amplifier 62 and to a horizontal error gated amplifier 64. In FIG. 6, the result is seen of adding a nutation voltage to the sweep voltages of sweep generators 53 and 54. As the cathode ray beam of tube 52 sweeps out its trace, the vertical nutation voltage causes the beam to appear first above then below a horizontal mean position. Simultaneously, the horizontal nutation voltage deflects the beam left and right as it moves along the range axis. The cathode ray spot therefore moves in rectangular fashion across the tube face following the pattern of FIG. 6. The gate voltage outputs of nutation generator 63 supply references of the position of the cathode ray trace to gated amplifiers 62 and 64, which, by the magnitude and polarity of their outputs, indicate the direction and amount of correction needed for best match. The input error signal to film drive servo 59 comprises the output of amplifier 62 while the output of gated amplifier 64 is fed back to horizontal sweep generator 53 to shift the average horizontal sweep position right or left as may be required to achieve a match between the film map 56 and the presentation of tube 52. It will be understood than an error in horizontal trace position would be caused by a shift in helicopter position to different range, while rotation of the helicopter would create an error in map alignment. An error in range does not seriously affect the ability of the apparatus to provide accurate map matching, provided returns from the more distant points only appear on film map 56. On the other hand, errors in azimuth caused by rotation of the helicopter create large errors in map match whatever the range of the points represented on the map. Therefore, although it is possible to arrange a film transport mechanism which shifts the film laterally upon the appearance of an error output from amplifier 64, shifting the average position of the trace horizontally provides a sufficiently accurate match, and is to be preferred for its simplicity.

Film drive servo 59 advances film map 56 to maintain the data recorded on the map in a matched relationship with the data presented on the face of tube 52. The antenna bearing during matched conditions is read directly from the film map by means of a digital antenna position readout circuit 65. The antenna position may be encoded on the film in any suitable manner either in the form of holes or magnetically. Since the film sprocket holes are subject to enlargement by use, followup means on servo 59 would not provide antenna position data with accuracy equal to readout circuit 65. The output of readout circuit 65 can be retained in digital form for entry into a missile defense coordination system and may also be applied to a digital to analogue converter 66 the output of which controls the sweep position of a radar display 68. It will be observed that the use of a Moving Target Indicator for display 68 is not precluded and may be very much desired to call the attention of the operator to the presence of a possible target.

Obviously many modifications and variations of the present invention are possible in the light of the above teachings. It is therefore to be understood that within the scope of the appended claims the invention may be practiced otherwise than as specifically described.

What is claimed is:

1. A radar system comprising, a transmitter, a receiver, an antenna for the reception and transmission of signals, a helicopter for elevating said antenna above the terrain, a cable for tethering said helicopter to confine radar operation to a particular area, a radar map of a substantial portion of the terrain surrounding the helicopter location, said map including representations of radar return signals from various fixed objects and means indicating the bearing to said objects from a known helicopter location, means for presenting a visual indication of the radar return signals from various fixed objects on the terrain beneath said helicopter, means for comparing said visual indications with said map representations to provide an error signal, means responsive to said error signal for shifting the position of said map representations relative to said visual indications to obtain alignment therebetween, and means responsive to said map bearing means for providing a signal representing the direction of pointing of said radar antenna.

2. A radar system comprising, a transmitter, a receiver, an antenna for the reception and transmission of signals, a helicopter for elevating said antenna above the terrain, a cable for tethering said helicopter to confine radar operation to a particular area, a cathode ray tube, means for modulating the intensity of the cathode rays in said tube in accordance with the power of the radar return signals, a transparent radar map including negative representations of radar return signals from fixed objects on the terrain obtained at known antenna bearing angles and having encoded thereon the bearing angles associated with said return signal representations, means for focusing the light output of said cathode ray tube on the surface of said map, a photoelectric transducer for providing a signal output related to the amount of light transmitted through said map, means controlled by said photoelectric transducer output for altering the relative position of said map representations and said cathode ray tube, and means for decoding the bearing angle information encoded on said map.

3. Apparatus as claimed in claim 2 with additionally, a nutation generator for periodically deflecting the cathode rays of said tube, and an error detector receiving the output of said photoelectric transducer and a portion of the output of said nutation generator, said position altering means being controlled by the output of said error detector, said error detector output indicating by the magnitude and polarity thereof the amount and direction of correction required of said position altering means to reduce the output of said photoelectric transducer.

4. A radar system comprising, a transmitter, a receiver, an antenna for the transmission and reception of signals, a helicopter for elevating said antenna above the terrain, a cable for tethering said helicopter and supplying power thereto, means including a cathode ray tube for presenting a visual indication of radar signals, a transparent map having thereon negative representations of radar return signals from fixed objects on the terrain at obtained known antenna bearing angles, a lens for focusing said visual indication on the surface of said map, a photoelectric transducer arranged to receive light originating at said cathode ray tube and transmitted through said map, an error detector receiving the output of said photoelectric transducer and providing a signal indicative of the error in alignment between said visual indication and said map representations, means controllable by said error detector output for altering the relative positions of said visual indication and said map representations to obtain alignment therebetween, and means providing information as to the antenna bearing angle from which said map representation was obtained.

5. Apparatus as claimed in claim 4 with additionally, a nutation generator for periodically altering the relative position of said visual indication and said map representation to provide an indication of the direction of alteration required in said relative position to achieve coincidence therebetween.

References Cited in the file of this patent

UNITED STATES PATENTS

| 2,526,682 | Mulberger | Oct. 24, 1950 |
| 2,787,188 | Berger | Apr. 2, 1957 |

FOREIGN PATENTS

| 16,153 | Great Britain | July 30, 1908 |